United States Patent [19]
Seth et al.

[11] Patent Number: 5,663,894
[45] Date of Patent: Sep. 2, 1997

[54] SYSTEM AND METHOD FOR MACHINING PROCESS CHARACTERIZATION USING MECHANICAL SIGNATURE ANALYSIS

[75] Inventors: Brij Bahadur Seth, Canton; Youssef Ali Hamidieh, Bloomfield Hills, both of Mich.

[73] Assignee: Ford Global Technologies, Inc., Dearborn, Mich.

[21] Appl. No.: 524,699

[22] Filed: Sep. 6, 1995

[51] Int. Cl.$^6$ .................................................. G05D 19/00
[52] U.S. Cl. .............................................. 364/508; 73/654
[58] Field of Search .................. 364/551.01, 474.17, 364/148, 474.16; 73/508, 654, 660, 763, 775, 119 R; 340/679, 683

[56] References Cited

U.S. PATENT DOCUMENTS

| | | | |
|---|---|---|---|
| H1006 | 12/1991 | Zwicke | 364/551.01 |
| 2,675,698 | 4/1954 | Johnson | 73/67 |
| 2,760,369 | 8/1956 | Vanator | 73/67 |
| 2,876,638 | 3/1959 | Diamond | 73/67.2 |
| 2,970,469 | 2/1961 | Feldman | 73/67.2 |
| 3,191,430 | 6/1965 | Gourley | 73/67 |
| 4,235,094 | 11/1980 | Matochkin et al. | 73/11 |
| 4,471,444 | 9/1984 | Yee et al. | 364/474.17 |
| 4,514,797 | 4/1985 | Begin | 364/148 |
| 4,559,600 | 12/1985 | Rao . | |
| 4,563,897 | 1/1986 | Moore . | |
| 4,744,242 | 5/1988 | Anderson et al. . | |
| 4,748,554 | 5/1988 | Gebauer et al. . | |
| 4,858,470 | 8/1989 | Kincaid et al. | 73/654 |
| 4,985,857 | 1/1991 | Bajpai et al. | 364/551.01 |
| 5,170,358 | 12/1992 | Delio . | |
| 5,179,860 | 1/1993 | Tsuboi | 73/579 |
| 5,214,960 | 6/1993 | Tsuboi | 73/579 |
| 5,258,923 | 11/1993 | Imam et al. | 364/508 |
| 5,407,265 | 4/1995 | Hamidieh et al. . | |

OTHER PUBLICATIONS

R. F. Burchill et al, "New Machinery Health Diagnostic Techniques Using High–Frequency Vibration", Society of Automotive Engineers, Inc., National Aerospace Engineering and Manufacturing Meeting, Los Angeles, CA, Oct. 16–18, 1973, SAE Transaction #730930, 8 pgs.

S.G. Braun et al, "Signature Analysis Methods and Applications for Rotating Machines", Contributed by the Automatic Control Division of The American Society of Mechanical Engineers for presentation at the Winter Annual Meeting, Atlanta, Georgia, Nov. 27–Dec. 2, 1977, 8 pgs.

J. Mathew et al, "The Condition Monitoring of Rolling Element Bearings Using Vibration Analysis", American Society of Mechanical Engineers, Acoustics Division, Winter Annual Meeting, Boston, Mass., Nov. 13–18, 1983, 8 pgs.

J. Mathew, "Machine Condition Monitoring Using Vibration Analyses", Acoustics Australia, vol. 15, No. 1–7, Received Jan. 6, 1987, pp. 1–7 to 1–13.

(List continued on next page.)

*Primary Examiner*—Emanuel T. Voeltz
*Assistant Examiner*—Thomas Peeso
*Attorney, Agent, or Firm*—Joseph W. Malleck; Roger L. May

[57] ABSTRACT

A system and method for characterizing a machining process using techniques of mechanical signature analysis produces discriminants based on vibrational activity, measured at various positions on a machine tool. The system and method provide a complete characterization of an industrial machine tool including the machining structure, tooling, fixturing, workpiece, and operating environment under transient and steady state conditions both with and without machining loads. The method includes selection of appropriate sensors (24), sensor locations (24), mounting methods (24), signal conditioning (26), and data acquisition (28) and analysis (30) based upon the particular type of machine and machining process. The vibration signature analysis includes both time and frequency domain analysis. Dynamic stiffness measurements (36) are utilized in combination with data gathered from the machine tool during idle and machining periods to generate uniform discriminants (32) which provide an indication of machine operation. Machine information, including the uniform discriminants, is preferably stored in a database for future comparison and trending.

17 Claims, 12 Drawing Sheets

OTHER PUBLICATIONS

J. T. Tranter, "The Application of Computers to Machinery Predictive Maintenance", Sound and Vibration, Dec., 1990, pp. 14–19.

Brij B. Seth et al., "Machine Condition Signature Analysis For Reliability & Maintainability Improvement", Presented & published in the proceedings of: The International Programmable Controls Conference, Apr., 1993, 12 pgs.

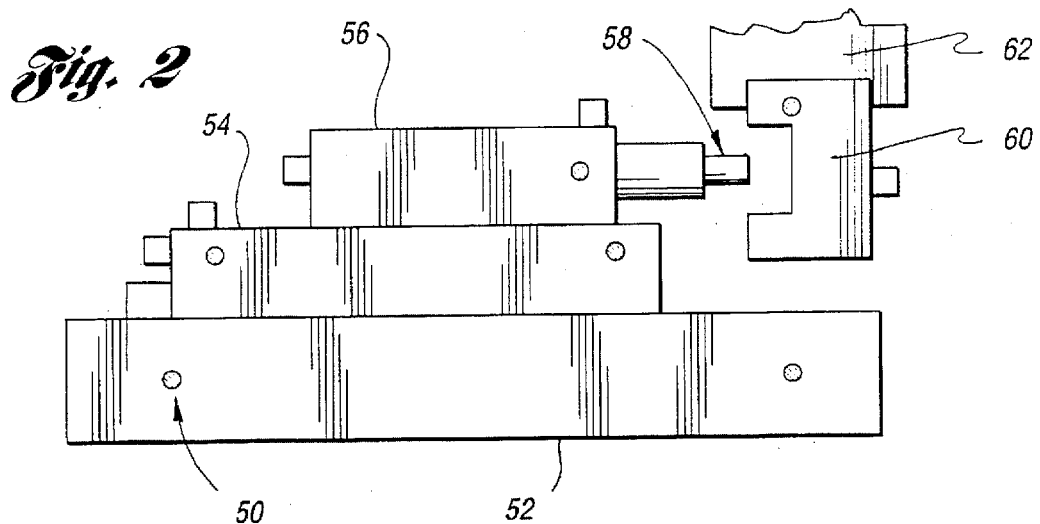
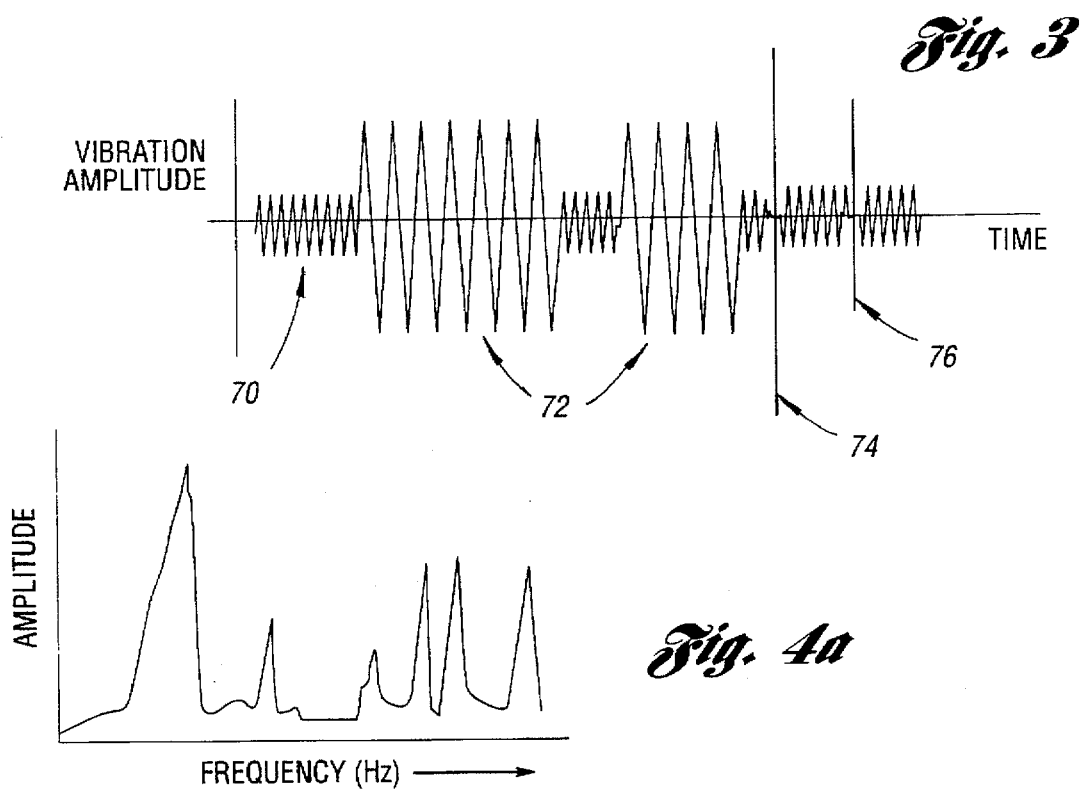
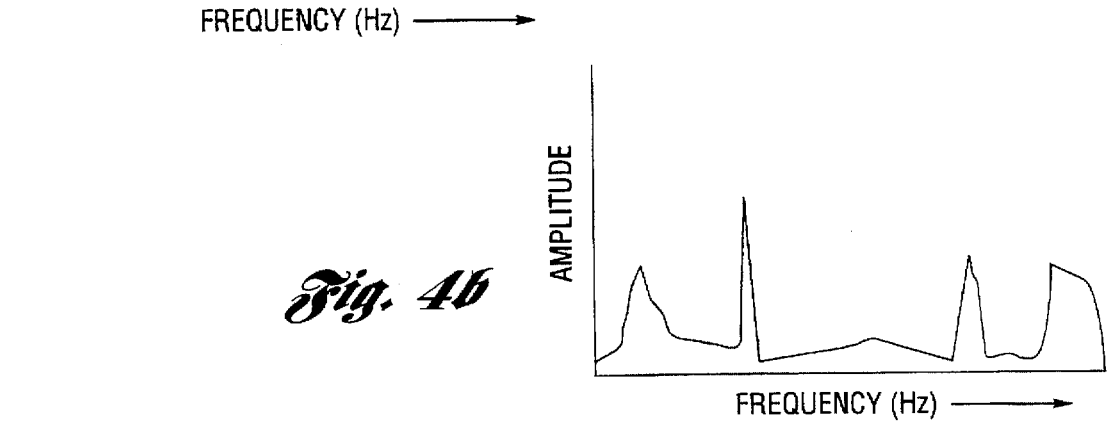

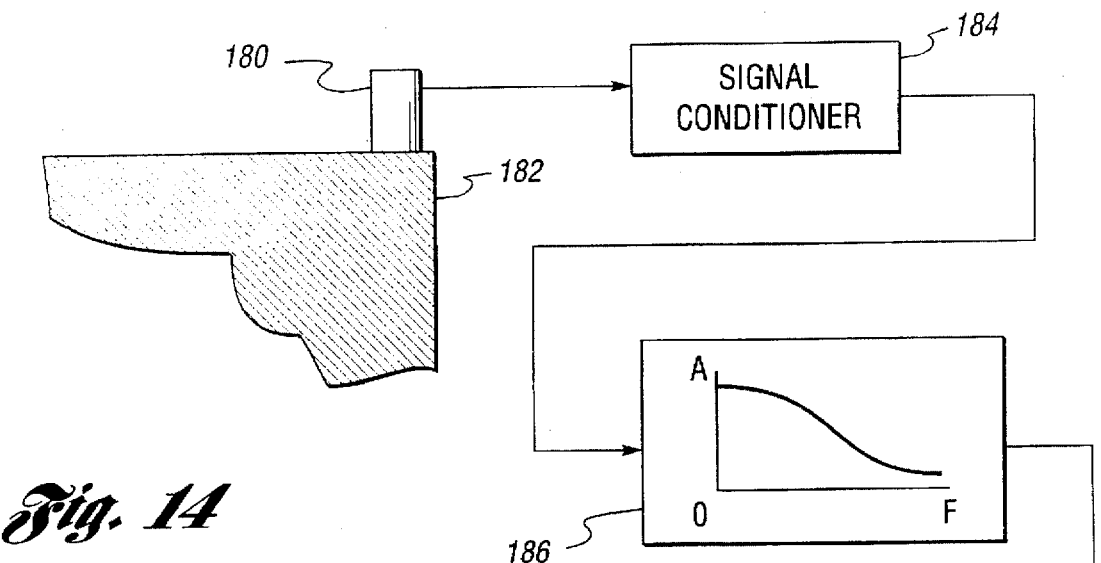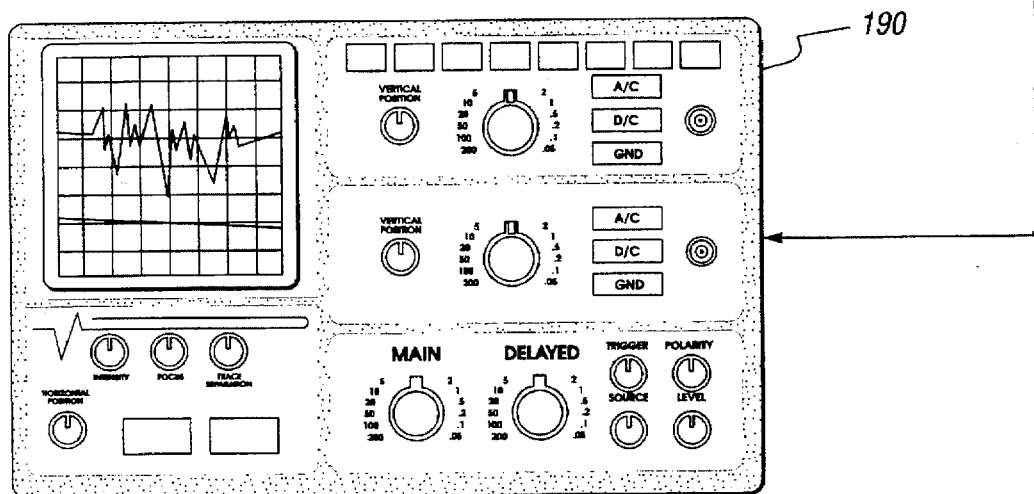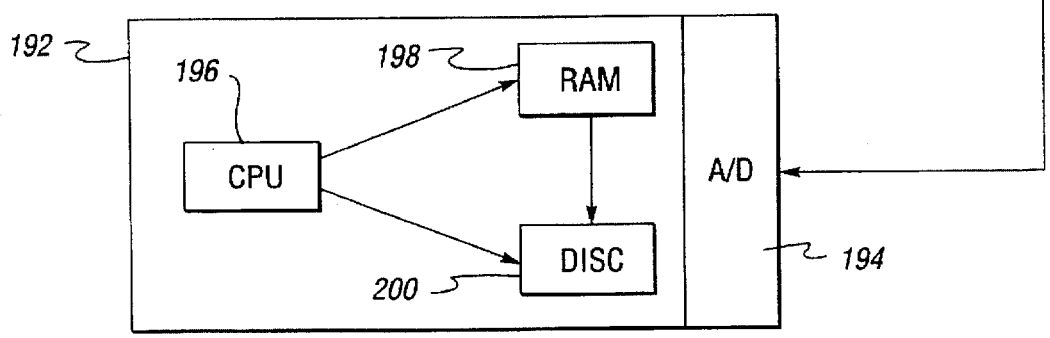
Fig. 14

SYSTEM AND METHOD FOR MACHINING PROCESS CHARACTERIZATION USING MECHANICAL SIGNATURE ANALYSIS

TECHNICAL FIELD

This invention relates to a generic method and associated system for applying mechanical signature analysis techniques to industrial machine tools.

BACKGROUND ART

A number of prior art systems and methods have been developed in an attempt to increase the reliability, predictability, and maintainability of industrial machine tools to achieve consistent product quality and machine productivity goals in high-volume production environments. These systems and methods typically focus on monitoring primary machine components such as motors and spindles under idle conditions. However, due to the complex interaction of various machine components, fixturing, workpiece variability, and the operating environment, among others, a systematic and comprehensive system and method for characterizing such machines and processes is needed.

One approach to detecting and correcting problems in a complex system, such as an industrial machine tool, is to monitor the major machine components such as the spindles, motors, pumps, and the like, in an attempt to isolate suspect components. Mechanical signature analysis techniques have been utilized to monitor relative distributions in the frequency domain of a vibration signal to identify pending failures. A number of advanced techniques particularly suited for detecting abnormalities in rotating machines, and for implementing process control in manufacturing environments have also been developed. However, such isolated characterization of machine components has proven to be inadequate as an indicator of long-term reliable performance of industrial machine tools.

As discussed in "Machine Condition Signature Analysis for Reliability and Maintainability Improvement," written by the inventors of the present invention and published in the Proceedings of the International Programmable Controls Conference in April, 1993, the disclosure of which is hereby incorporated by reference in its entirety, it is desirable to characterize not only the individual elements of a particular machine tool, but also the interactions between these elements and the operating environment, which often includes various other operating machine tools. While that paper discloses a methodology for applying mechanical signature analysis techniques to characterize the interactions between various machine elements, it does not provide a generic, systematic method and associated system which characterizes machine components, structure, tooling, fixtures, and the workpiece as an integral system.

SUMMARY OF THE INVENTION

It is thus an object of the present invention to provide a system and method for machining process characterization using mechanical signature analysis which includes characterizing machine components, structure, tooling, fixtures, and the workpiece as an integral system.

In carrying out this and other objects of the present invention, a method is provided for machine tool and machining process characterization which includes systematically determining machine test conditions; determining testing parameters and instrumentation such as sensor locations, mounting methods, signal conditioning, data acquisition and analysis; gathering data from the machine tool during idle and machining periods; analyzing the collected data in the time and frequency domains; measuring machine response to a calibrated impact at various machine locations; and storing the results for future comparison and trending.

A system is also provided for carrying out a method of machine process characterization according to the present invention.

The advantages accruing to the present invention are numerous. The present invention applies mechanical signature analysis techniques on a system's level to significantly improve reliability and maintainability of machinery and equipment. The present invention provides a complete characterization of an industrial machine tool including the machine structure, tooling, fixturing, workpiece, and operating environment under transient and steady state conditions both with and without machining loads. The present invention provides a system and method which may be utilized to verify actual machine build to the design intent. The present invention may also be used to identify the root cause of various anomalies in existing machinery. The present invention also facilitates discriminants-based maintenance through use of baseline and trending information.

The systems and method of the present invention may be utilized in a number of applications, such as characterization of new machinery for acceptance and launch verification, identification and isolation of root cause problems which may reduce longer capability of the machining process, performance comparison of machines prior to acquisition, evaluation of machinability of alternative workpiece materials, and evaluation of alternative process parameters and their effect on long-term process capabilities.

The above object and other objects, features, and advantages of the present invention will be readily appreciated by one of ordinary skill in the art from the following detailed description of the best mode for carrying out the invention when taken in conjunction with the accompanying drawings.

BRIEF DESCRIPTION OF THE DRAWINGS

FIG. 2 is a simplified diagrammatic representation of a machine tool with an associated clamping fixture, workpiece, and sensor locations;

FIG. 3 is a graphical representation of a vibrational amplitude signal captured in accordance with the present invention for idle and machining periods of a machining cycle;

FIGS. 4A and 4B illustrate frequency domain analysis of the vibrational amplitude signal with and without machining, respectively, according to the present invention;

FIG. 14 illustrates a schematic diagram including data acquisition, analysis, and storage according to the present invention;

BEST MODES FOR CARRYING OUT THE INVENTION

Figure 1:
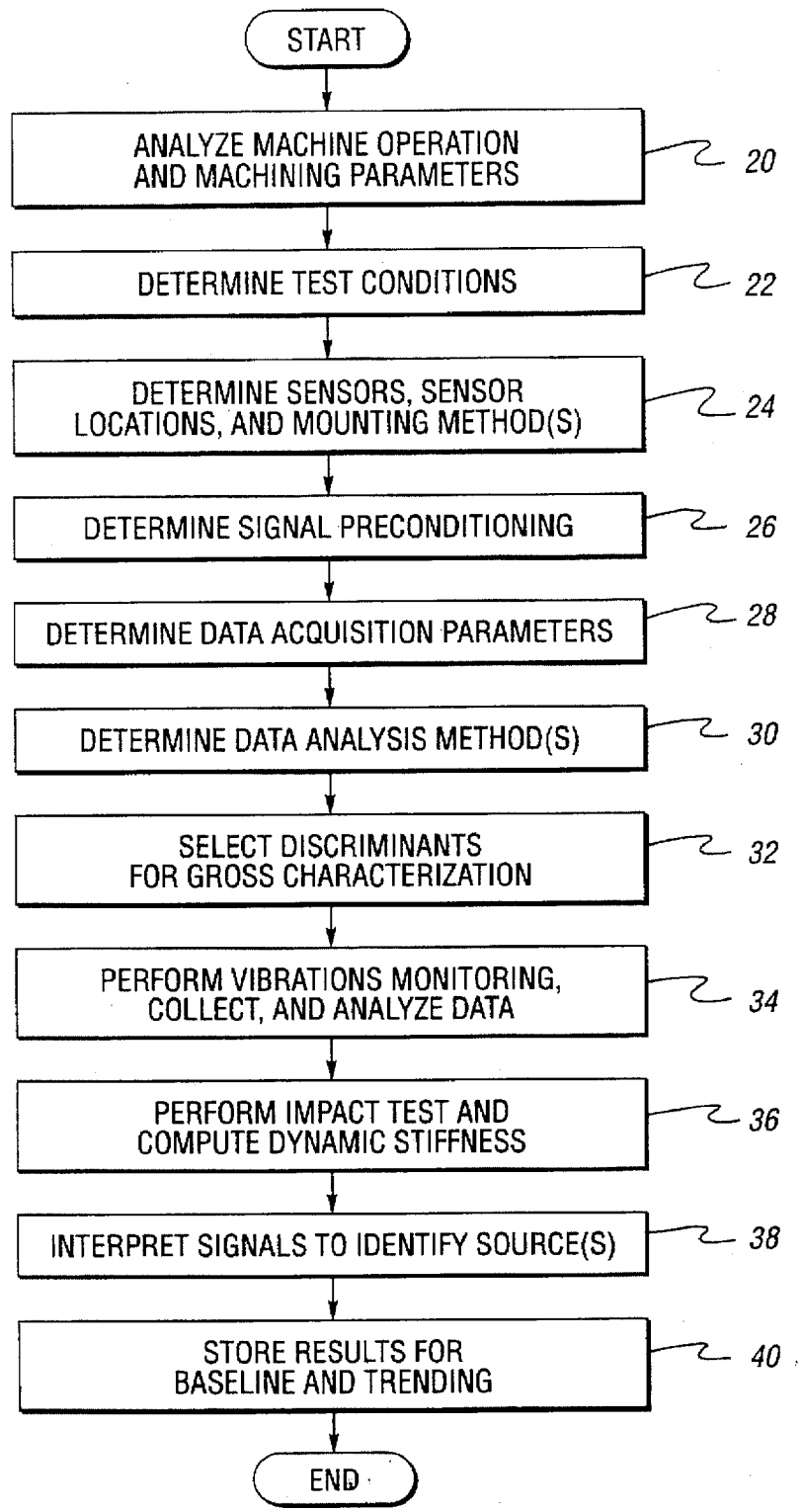
FIG. 1 is a flow chart illustrating a method for machine process characterization using mechanical signature analysis according to the present invention.

Referring now to FIG. 1, a flow chart illustrating a system and method for machining process characterization using mechanical signature analysis according to the present invention is shown. Since each machining process represents a complex system and has unique characteristics, the system and method begin at block 20 with the understanding of the machine operation and machining parameters. A number of the subsequent steps performed according to the system and method of the present invention utilize theoretically and empirically deduced information based on the particular type of machine and the machining parameters. It is desirable for the test engineer to have a thorough understanding of the operation of the machine since the mechanical vibration signature which will be attained is associated with the physical events occurring during the machining process. For example, analysis of the machining process allows correlation of various events such as slide positioning impacts, increases or decreases in rotating component speeds due to changes in material removal rates from the workpiece, and increases and decreases in tool loading forces with their corresponding vibrational signature characteristics.

Understanding of machine operation and machine parameters as represented by block 20 includes identification of various machining components which may induce undesirable vibrations during the machining process. Determination of the presence of a spindle, or multiple spindles, slide ball screws, slide gibs, slide guides, the type of machine base, the type of fixturing, presence of positioning motors (such as stepper motors, servo motors, and the like), lubrication and coolant pumps, and other like determinations are made during this analysis. In addition to examined the machine to be tested, the operating environment should also be analyzed to determine the influence of adjoining machines on the vibrational signature of the machine under test. This information may be entered into a database, such as the database illustrated and described with reference to FIG. 15, which may recommend sensor type, mounting method, placement, etc. as described herein.

Test conditions are determined as represented by block 22 of FIG. 1. In this step, a decision is made regarding the particular test conditions for which the vibrational signals will be monitored. Depending upon the determinations of the previous step, testing may be conducted under steady-state and/or transient conditions; under idle conditions (i.e. when cutting air), and/or under actual machining conditions. The objective of this step is to obtain the maximum information about the system while conducting a minimum number of tests. Judicious selection of the number of tests and the testing conditions is desirable in order to avoid gathering data which provides little or no information relative to identification of potential problems during the machining process.

Monitoring of an idle cycle of a machine refers to the condition when the machine executes the entire machine cycle, but actual machining of the workpiece is not performed. Characterization of machines under idle conditions is performed to monitor vibrations due to positioning of various components, such as slides, and to capture the general vibrational characteristics of the machine structure without the cutting action.

Steady-state monitoring is performed when the operating conditions of the machine do not vary with time. Generally, spindle vibration characteristics are monitored under steady-state conditions. In addition, the spindle may be monitored separately from the machine in a laboratory test setup where the spindle is operated at a constant speed without cutting. Monitoring may also be performed under steady-state conditions with the spindle installed on the machine.

Transient conditions are characterized by a significant variation as a function of time. Rapid motions of slides, acceleration and deceleration of spindles, and changing machine loads associated with machining a particular workpiece are examples of transient conditions. Vibrations monitoring under transient conditions necessitates high sampling rates, dictated by the Nyquist Criterion (to correctly capture the event).

Complete machine characterization also includes vibrations monitoring while a workpiece is being machined. Forces of significant magnitude are encountered under typical machining conditions. These forces may cause excitation of the various elements of the machining system, thereby resulting in a response which is a function of the particular machining process parameters, such as tool speed, feed, and depth of cut. The resulting response will be unique for a particular workpiece of a particular material fixtured in a particular manner.

With continuing reference to FIG. 1, block 24 represents a selection of the various sensors, sensor locations, and mounting methods based on the previous steps. Various types of displacement and acceleration sensors may be utilized depending on the particular machine and test conditions. Frequency content of the signal of interest, sensor sensitivity, and the test environment are also important factors in selecting appropriate monitoring sensors.

Measurement of acceleration provides a prediction of dynamic loads for a particular structure or system. Acceleration measurements provide information relative to the forces acting in various machine components and the reaction of various structural components of the machine to these forces. Furthermore, appropriate integration of the acceleration signal provides a measurement of velocity and displacement.

In selecting an appropriate sensor, as indicated by block 24, a decision is typically made between two basic types of accelerometers; compression and shear. Piezoelectric accelerometers are also available in small sizes and low weights so that they can be attached to various components without distorting the vibration signature.

In general, block 24 of FIG. 1 results in the selection of a shear-type accelerometer for machine characterization measurements because these accelerometers are less sensitive to temperature variations which may be encountered during a machining cycle, especially under wet cutting conditions. In shear-type accelerometers, a small mass exerts a shear force upon a piezoelectric element which is indicative of the acceleration of the mass.

Accelerometers have a limited frequency response with the upper frequency limit being determined by the natural frequency of the mass-spring system of the accelerometer itself. Since the accelerometer will exhibit a highly exaggerated response near its resonant frequency, the typical usable frequency range is about ⅓ of the resonant frequency.

In a preferred embodiment of the present invention, a heavy-duty, "industrial," shear-type accelerometer is utilized to measure the vibrational signature of a machine. Preferably, the accelerometer exhibits ruggedness for making measurements in harsh environments, a high sensitivity and high range (generally up to 100 g), and a minimum mass-loading effect for typical vibration measurements of machine elements. A typical operational range for the application cited spans 10 kHz with a sensitivity of 10 mV/g to 100 mV/g with an isolated ground.

Selection of sensor locations is very important; selection should be such to provide information on spindle bearings, slides, workpiece, fixturing, machine structure, spindle motors and pumps. Also, vibration signatures should be obtained for various directions and should compare the levels about the axes of symmetry. If there is more than one identified station, the levels should be compared for the identical points on the machines. Furthermore, it is desirable that vibration signatures should be captured simultaneously on several locations in order to analyze response of several components when subjected to machining forces.

Once selected, an appropriate mounting method is chosen as also indicated by Block 24 of FIG. 1. Appropriate selection of a method of attaching an accelerometer to a vibrating surface is important in obtaining accurate measurements. Improper mounting may result in an attenuated response of the sensor which limits the useable frequency range of the instrument. It is desirable to mount the accelerometer with its main sensitivity axis parallel to the desired measuring direction. Also preferably, a mounting position is selected so as to obtain a short, rigid mechanical path from the vibration source to the sensor.

Most preferably, the accelerometer is mounted by engagement with a threaded stud such that it makes contact with a flat, smooth surface. Also preferably, a thin layer of grease is applied to the mounting surface before securing the accelerometer to improve the sensor contact with the surface. In some applications, a mica washer and isolated stud are utilized to provide electrical isolation of the accelerometer from the vibrating surface. Although stud mounting exhibits superior measurement characteristics, it requires a destructive operation of drilling and tapping a hole into the vibrating surface, and is thus undesirable for some applications.

A relatively non-destructive mounting method which exhibits relatively good vibrational characteristics utilizes a hard glue or epoxy to securely attach the sensor to a vibrating surface.

Selection of other alternative mounting methods, as represented by Block 24 of FIG. 1, includes using a permanent magnet to secure the accelerometer to the vibrating surface.

With continuing reference to FIG. 1, Block 26 represents determining and applying appropriate signal preconditioning. Preconditioning of the vibrational signals is utilized to enhance the signal to noise ratio (SNR). Appropriate signal amplification combined with low pass and/or high pass filtering is useful in many applications. Filter characteristics, such as the cut-off frequency and slope, are selected according to the type of signal being monitored. Preferably, filters are selected to reject high frequency non-coherent noise in the vibration signal.

Since the electrical signals produced by many sensors, such as accelerometers, have small magnitudes, it is desirable to amplify these signals close to their source so as to reduce the effect of electrical noise. Preferably, operational amplifiers are utilized to produce the required amplification.

Determining signal preconditioning, as indicated by Block 26, incorporates certain aspects of the sensor location and mounting method as represented in Block 24. For example, it is desirable to minimize the potential for the formation of ground loops which tend to interfere with the desired signals. Similarly, it is preferable to avoid long cable runs between the sensors and the preconditioning or data gathering equipment as these can introduce varying amounts of electrical noise into the signal. Likewise, appropriate connectors should be utilized to protect the sensors from oil, moisture, and the like during monitoring.

Block 28 of FIG. 1 represents selection and application of data acquisition parameters. Data sampling rates and the mode of data digitization are the two main factors for consideration. The Nyquist Criterion imposes the requirement that sampling be performed at a frequency greater than or equal to twice the highest frequency of the signal being monitored. As such, for machine characterization according to the present invention, sample rates of 10 kHz or higher are preferable. The mode of data digitization is important for the proper identification and isolation of events during a machining process. Time-based sampling digitization is sufficient for many applications. However, in some circumstances such as when an event takes place for a particular spindle/tool angular position, the use of external event-based sampling is indicated. One example of an external event-based signal is the synchronization signal provided by an encoder. Since the signals provided by various sensors, including accelerometers, are typically analog signals, they must be converted to a digital representation to facilitate processing by a digital computer.

Another data acquisition parameter which must be determined by Block 28 of FIG. 1 is the apportioning of the recorded information into a number of windows, each consisting of a block of sampled data points, so that the Fourier Transform may be computed. Preferably, the Fourier Transform is computed using the Fast Fourier Transform (FFT) algorithm as is well known in the art. If the time frequency of the various windows is such that a complete number of cycles is contained within a window, that window is said to be periodic in the time records. However, if the time record does not contain a number of complete sine waves, then the frequency information will be distorted, which is known as leakage. Leakage effects are reduced by employing a window function which has a finite gain about its central region that tapers off to zero near its boundaries. This type of window function is preferably not used for transient signals, which would normally decay to near zero prior to the end of the time record.

With continuing reference to FIG. 1, Block 30 represents determination of the appropriate data analysis methods. While data acquisition strategy determines the amount and rate of data collection during a particular test, data analysis comprises applying data reduction techniques to reduce the number of data points which were collected during the test, while maintaining the relevant information in the data. The main objective of data analysis is to enhance the signals so that uniform discriminants may be identified. Discriminants are signal features which may be used to distinguish between different states of the system which produced the signal.

Preferably, determination and application of data analysis, as represented by Block 30, includes both time domain analysis and frequency domain analysis. Time domain analysis may include averaging to extract periodic components from a complex signal. As a coherent technique, time domain averaging requires apriori knowledge of the period of the signal component which is to be extracted. This technique involves averaging the magnitude of points which occur one period apart over several periods. Time domain averaging is particularly suited for vibrational signals generated by rotating machinery, especially when an external synchronizing signal is available. Time domain averaging is preferably not utilized when examining transient signals because of the characteristic non-repetitive content and the requirement of a precise trigger to avoid significant attenuation of the measured signal.

In a preferred embodiment, frequency domain analysis is performed utilizing the Fourier Transform (computed using the FFT). Frequency domain analysis represents a signal by a finite number of points which provides the content of the signal at different frequencies. This intermediate data reduction facilitates pattern recognition and is useful in determining the presence of periodic components in complex signals of random or deterministic nature.

The step of discriminant selection for gross characterization of machining processes, as represented by Block 32 of FIG. 1, includes extraction of a limited number of relevant characteristics of the signal obtained from processing the data. For example, signal maxima, energy within one or more preselected event windows, and frequency domain distribution may be used as discriminants for signal interpretation. The minimum dynamic stiffness and the corresponding frequency are also discriminants of interest as explained in greater detail herein. Selection and storage of uniform discriminants reduces the amount of storage space required while providing a means of comparison among various machines. In addition, a machine's performance may be tracked over time to facilitate discriminants-based maintenance programs. Block 34 of FIG. 1 represents the actual collection and data analysis in accordance with the parameters selected by the previous steps.

Interpretation of selected discriminants is represented by Block 38 of FIG. 1. Signal interpretation may be utilized to detect imbalance, misalignment, mechanical looseness, gear defects, bearing defects, chatter, inadequate fixturing, tooling problems, and structural problems, among other operating anomalies.

For example, bearing defects occurring in the inner race, outer race, cage, or balls and rollers of a bearing, have distinctive characteristics in the frequency domain, as is well known in the art. Unlike the sinusoidal vibrations due to an unbalanced mass, vibrations due to bearing defects are caused by impacts which result in impulsive loading with sharp edges. These vibrations will result in a large number of higher frequency harmonics in the frequency spectrum which makes the diagnoses more difficult.

Monitoring of machine characterization signatures over a period of time relative to a base line signature is especially useful in detecting bearing defects. The dynamic stiffness data is correlated with the vibration data obtained for the complete machining cycle, with cutting action, in order to gain further insight into the dynamic events taking place during machining. For instance, inadequate stiffness of a particular machine component may be manifested as chatter during a portion of the machining cycle. This condition is indicated when the chatter spectral frequency coincides with the frequency of minimum dynamic stiffness of that machine component, such as a tool, spindle, workpiece and fixturing.

Block 36 of FIG. 1 represents performing impact tests and computing dynamic stiffness. Dynamic stiffness of a machine element reflects its ability to withstand machining forces. The dynamic stiffness information is described through its magnitude and as a function of frequency. Dynamic stiffness measurement is illustrated and described in detail with reference to FIG. 7.

Block 40 of FIG. 1 represents storage and documentation of results to establish base-line signatures and identify trends of machine characterization signatures over time.

Referring now to FIG. 2, a diagrammatic representation of a typical machine tool is illustrated. Representative sensor placement is indicated generally by reference numeral 50. As illustrated, preferably measurements are taken at multiple positions on the various machine components such as machine base 52, slide 54, spindle 56, tool 58, workpiece 60 and clamping fixture 62 so as to characterize the vibrations associated with interaction of the various components.

A typical vibrational signal is graphically illustrated in FIG. 3. Preferably, data is gathered for a complete machining cycle with periods when there is no machining 70, as well as the machining periods 72. The vibrational amplitude is generally greater during machining periods due to the effect of machining forces on the system. High amplitude transients such as spike 74 and spike 76 should also be captured during the characterization process. Such transients may be caused by, for example, slide positioning impacts.

Frequency domain analysis of the signal illustrated in FIG. 3 may result in corresponding signals such as those represented graphically in FIGS. 4A and 4B. Preferably, the signal is separated into various windows having a finite number of data points to analyze the signal in the frequency domain. Thus, FIG. 4A represents the frequency domain signal during machining period 72 whereas FIG. 4B represents the frequency domain signal corresponding to a period where there is no machining 70.

Figure 5:
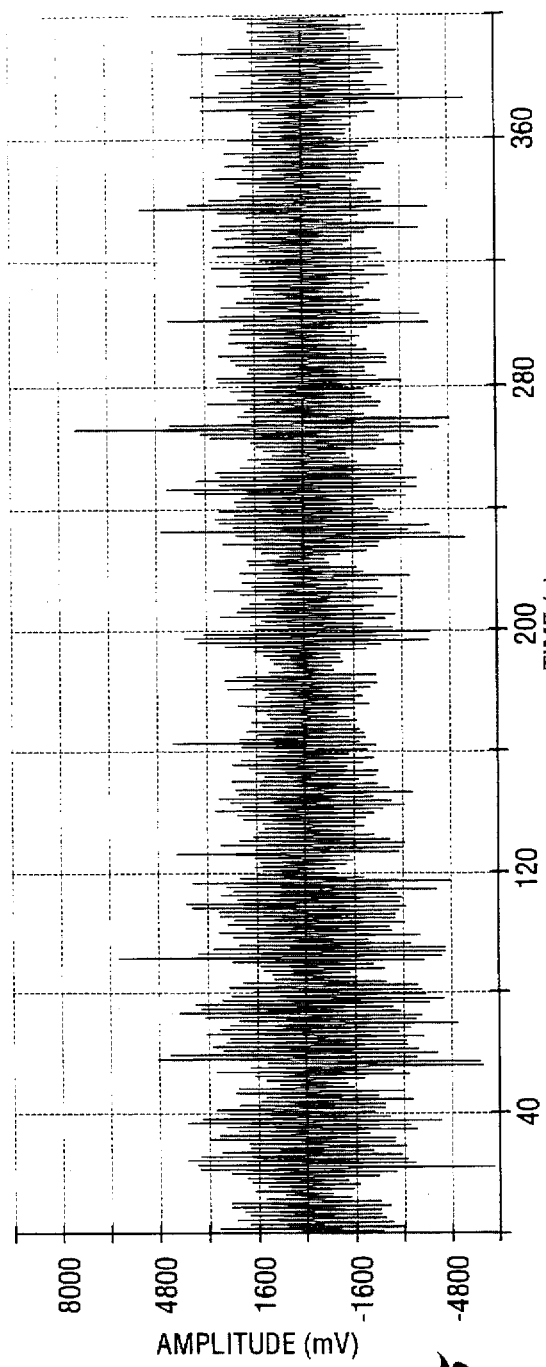
FIG. 5 illustrates an actual vibrational amplitude plot as a function of time.
Figure 6:
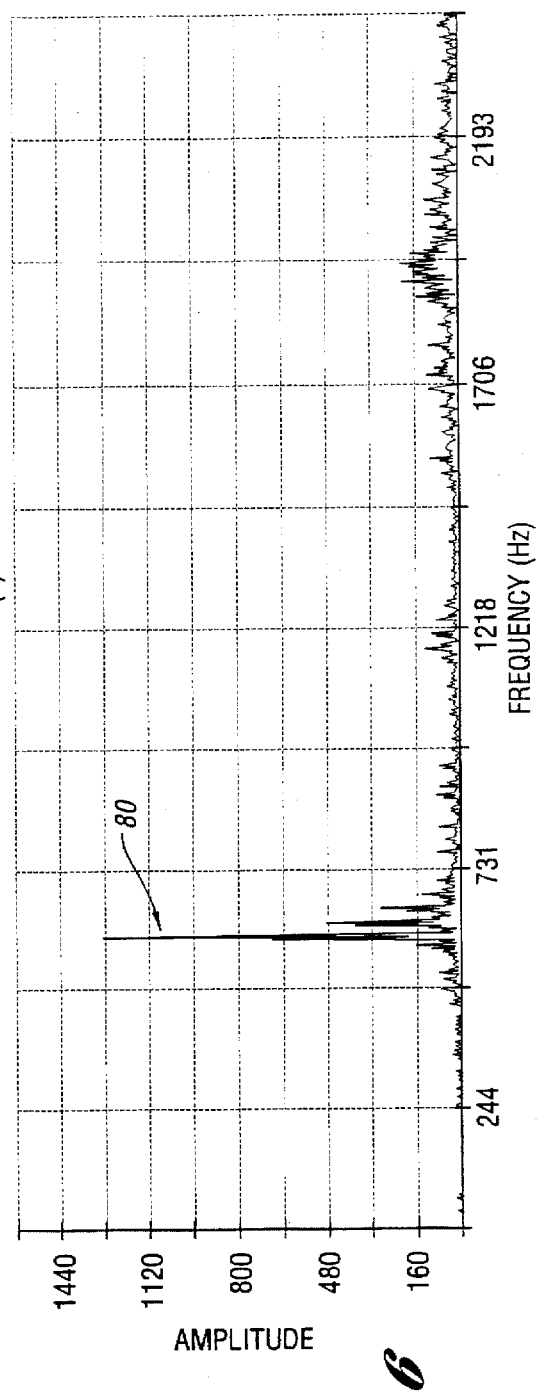
FIG. 6 illustrates a Fast Fourier Transform (FFT) of the vibrational amplitude signal illustrated in FIG. 5.

Referring now to FIGS. 5 and 6, an actual plot of a vibration signal and its corresponding frequency domain representation are shown, respectively. The vibrational amplitude is generally measured in volts or millivolts which corresponds to an acceleration measured in g's, the relationship of which depends on the particular preconditioning and amplification utilized. As illustrated by FIGS. 5 and 6, a dominant frequency component is difficult to detect in the time domain vibrational amplitude plot, but quickly appears as a large magnitude peak 80 in the frequency domain.

Referring now to FIGS. 7, 8, and 9A–9F, determination of dynamic stiffness measurements for a machine tool is illustrated. Dynamic stiffness characterizes the rigidity of a component as a function of frequency. Unlike static stiffness measurements, which apply a load under static condition and measure the resulting deformation or displacement, the dynamic stiffness measurements capture the changing response of a particular machine component at a particular excitation frequency. The minimum value of the dynamic stiffness and its associated frequency is of particular interest since this indicates the relative tendency of that component to vibrate at that frequency.

Figure 7:
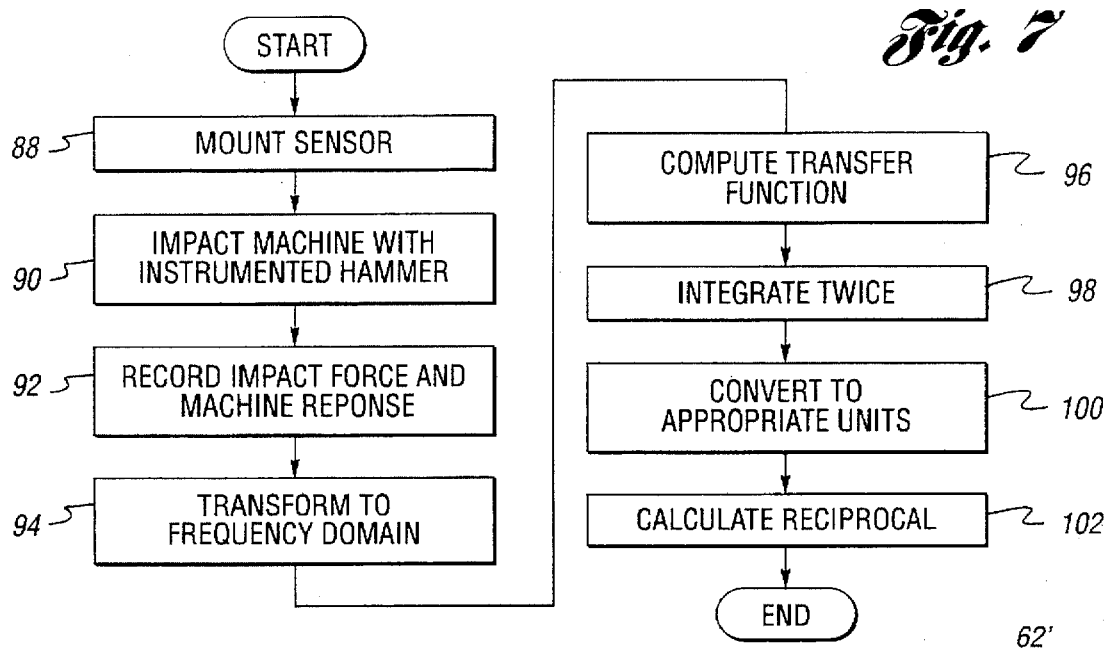
FIG. 7 is a flow chart illustrating a method for measuring and calculating a minimum dynamic stiffness measurement.

After attaching the vibration sensor as indicated by block 88, the first step in determining the dynamic stiffness, as represented by block 90 of FIG. 7, includes impacting the machine with a calibrated or instrumented hammer. The input force and the machine response are then acquired as indicated by block 92. The transformation to the frequency domain is performed as indicated by block 94. Preferably, a Fourier transformation is performed to convert the signal from the time domain to the frequency domain. The transfer function is computed as indicated by block 96, by taking a ratio of the transform of the machine response to the transform of the input. The result of block 96 is integrated twice as represented by block 98 and an appropriate conversion factor is applied as indicated by block 100 to represent the signal in the desired units. The reciprocal of the result obtained then provides the dynamic stiffness value as indicated by block 102. The minimum values and the corresponding frequencies are then determined.

Figure 8A:
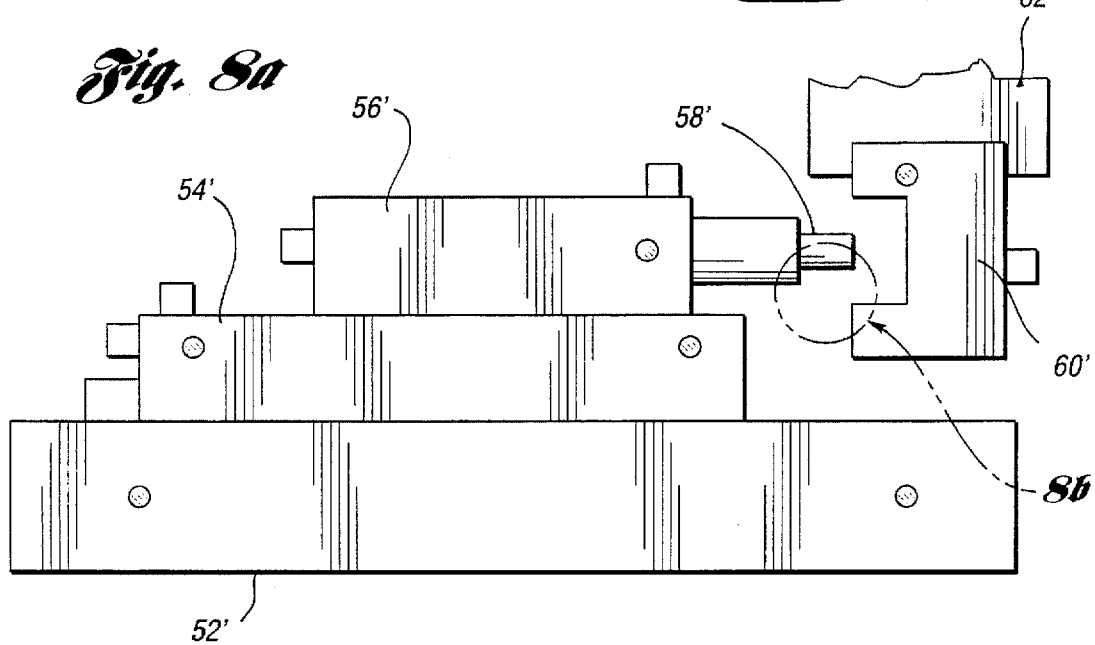
FIGS. 8a and 8b are simplified diagrammatic representations of a machine tool showing locations for determining the dynamic stiffness.
Figure 8B:
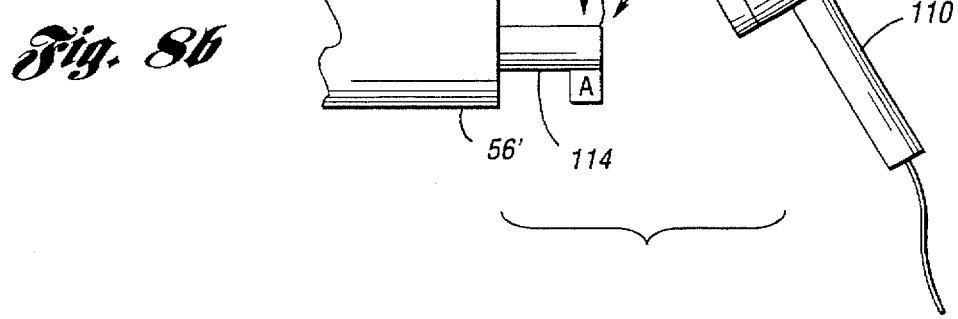

FIG. 8 is a graphical representation of the determination of dynamic stiffness measurements. As illustrated, an instrumented hammer 110 includes a transducer to measure the force F introduced to the machine at one or more locations of interest, such as the end of spindle 56' or tool holder 114. Impact tests are conducted for tooling, spindle housing, slides, workpiece, fixturing, and all other major structural components in various directions.

Figure 9A:
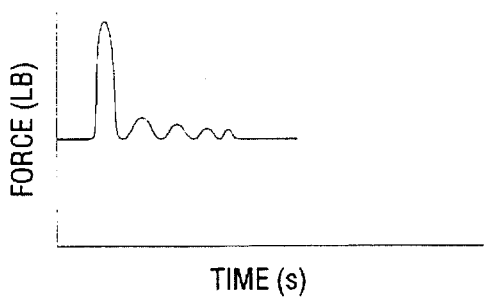
FIG. 9A illustrates a representative force input for a dynamic stiffness determination.
Figure 9B:
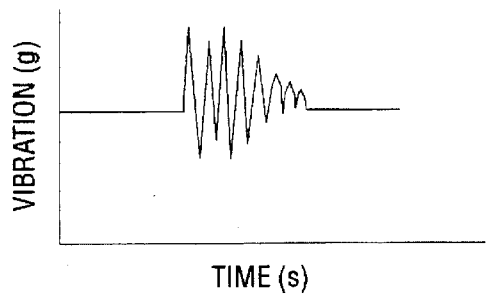
FIG. 9B illustrates a representative vibrational amplitude response to the force input of FIG. 9A.
Figure 9C:
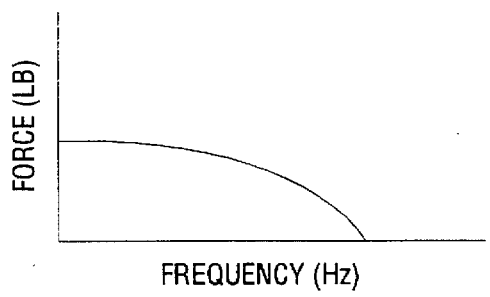
FIG. 9C is a frequency domain representation of a force input, such as that illustrated in FIG. 9A.
Figure 9D:
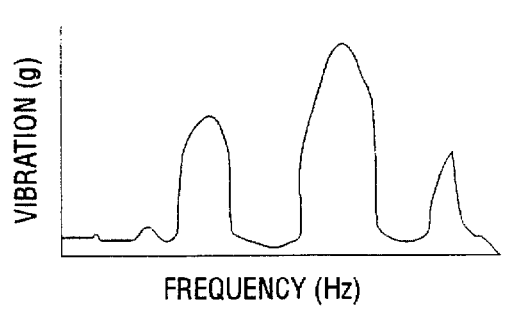
FIG. 9D is a frequency domain representation of a vibrational amplitude response, such as that illustrated by FIG. 9B.
Figure 9E:
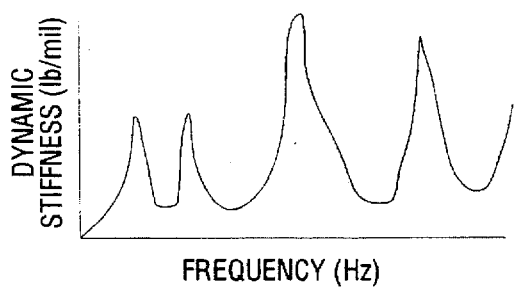
FIG. 9E illustrates the magnitude of the dynamic stiffness of a machine tool as a function of frequency.
Figure 9F:
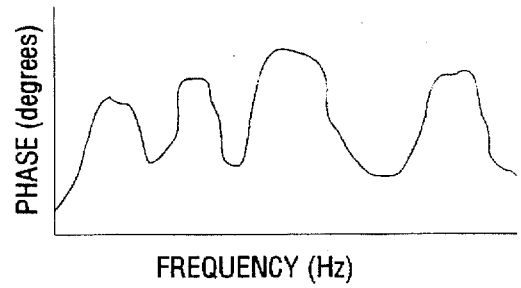
FIG. 9F illustrates the phase of the dynamic stiffness of a machine tool as a function of frequency.

FIGS. 9A–9F are graphical representations of various signals encountered during dynamic stiffness measurements. FIG. 9A represents an input force generated by a calibrated hammer, such as hammer 110. FIG. 9B represents the response to the input force F of FIG. 9A measured at one location on the machine tool. FIG. 9C characterizes the frequency domain representation of the force input of FIG. 9A. FIG. 9D illustrates the frequency domain representation of the vibration response illustrated in FIG. 9B. FIGS. 9E and 9F illustrate the magnitude and phase, respectively, of the dynamic stiffness which is calculated as described in detail with reference to FIG. 7.

Figure 10A:
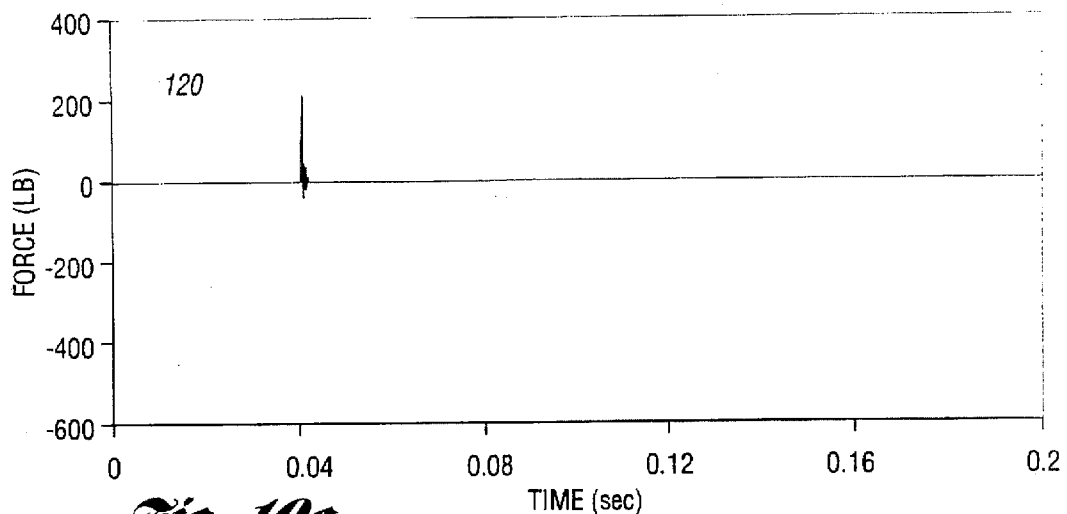
FIG. 10A is a graph illustrating an actual input force for determination of minimum dynamic stiffness according to the present invention.
Figure 10B:
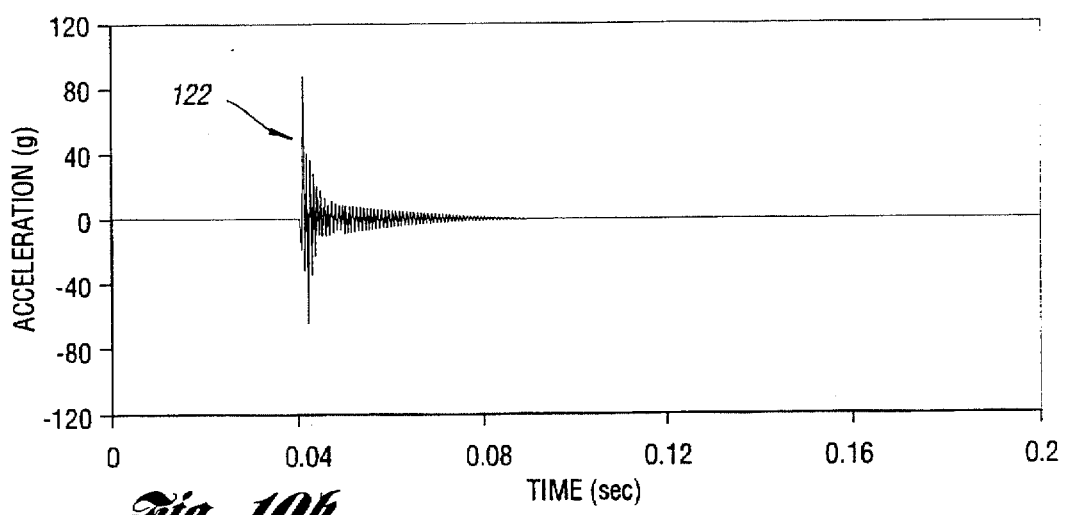
FIG. 10B illustrates a vibrational amplitude response to the input force of FIG. 10A.
Figure 10C:
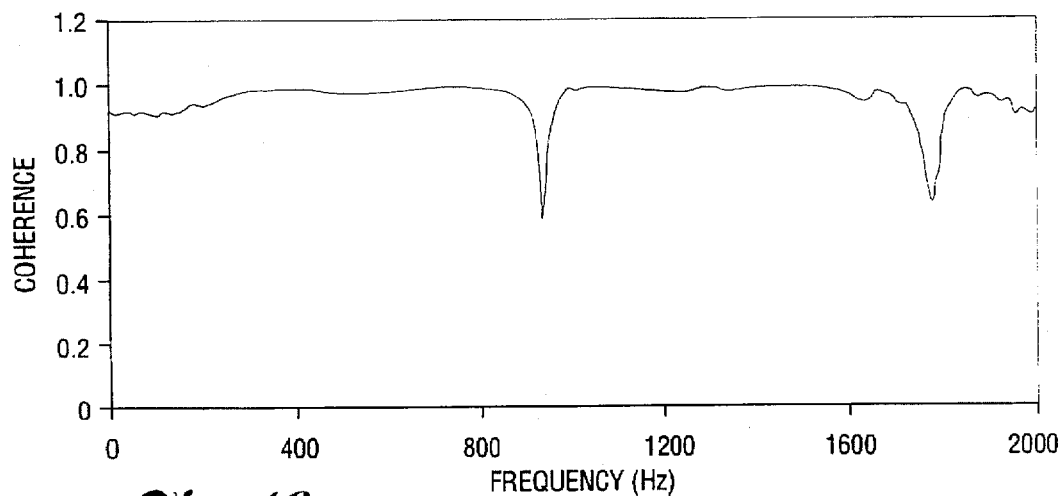
FIG. 10C illustrates the coherence of the input force of FIG. 10A and the resulting response illustrated in FIG. 10B as a function of frequency.

FIGS. 10A–10C illustrate the actual signals in a dynamic stiffness test. FIG. 10A represents the input force 120 in pounds as a function of time. FIG. 10B represents the corresponding acceleration (vibration) response 122 to the input force 120 illustrated in FIG. 10A. The impact force excites the machine component over a wide range of frequencies such that the component response reflects the modes of vibration of the component. The transformation (amplitude and phase) thus represents a normalized output for each unit of the input, as a function of frequency.

A coherence measurement may also be computed in impact testing as a "data integrity" check. The coherence measurement provides a graphical illustration of the causal relationship between the input and the output. The coherence values range between zero and unity, reflecting no coherence and complete coherence, respectively. No coherence at a given frequency indicates that the output response at that frequency was not caused by the input, but rather by some undesirable noise. Complete coherence at a given frequency indicates that the output at that frequency was solely due to the applied input. Thus, a coherence value approaching unity provides greater confidence in the test measurements. FIG. 10C illustrates a coherence measurement corresponding to the input illustrated in FIG. 10A and the resulting response illustrated in FIG. 10B.

Figure 11:
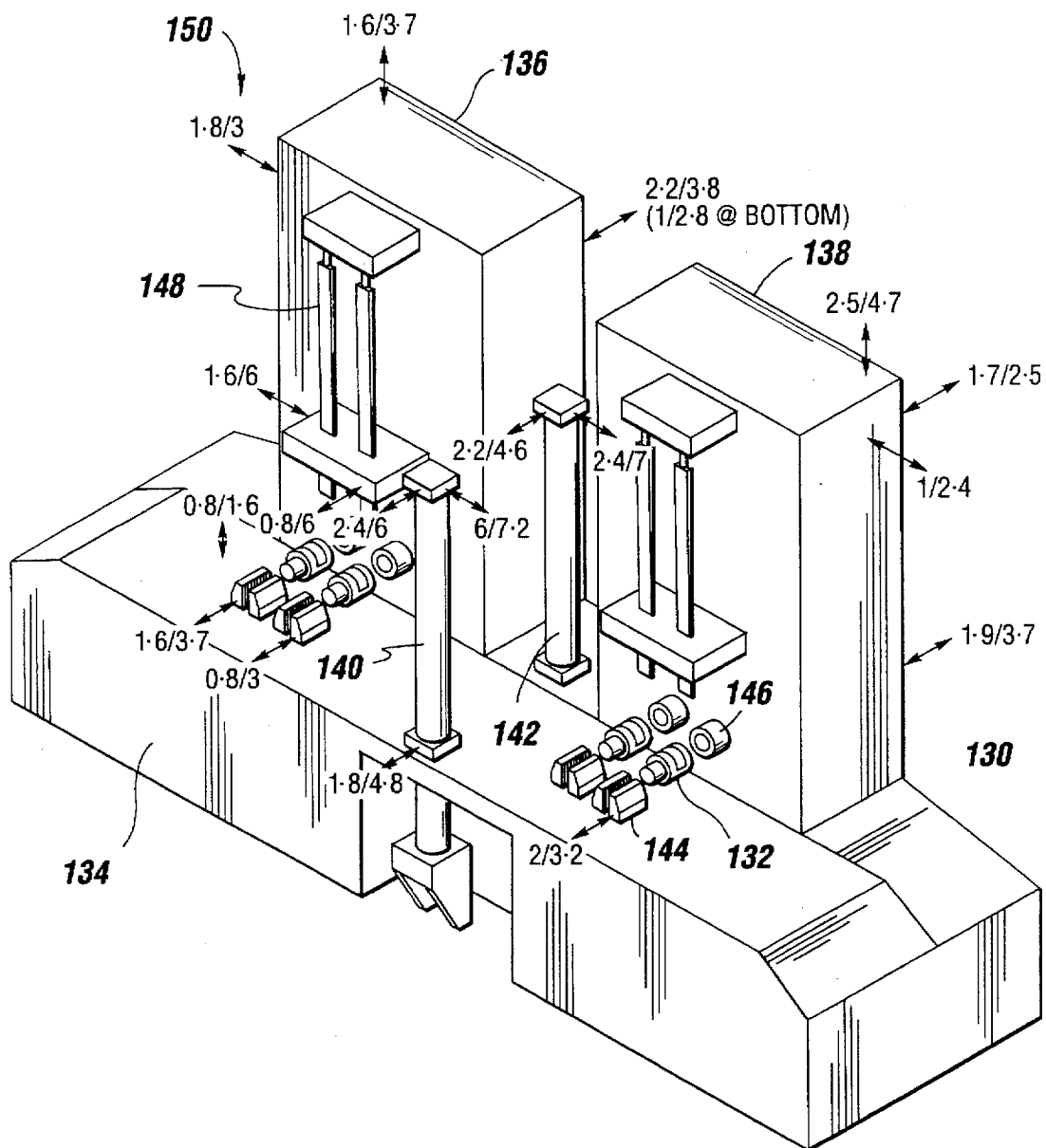
FIG. 11 illustrates overall vibrational levels and spike amplitudes for a representative machine tool characterized using the present invention.

Referring now to FIG. 11, vibration level mapping for a representative machine tool according to the present invention is illustrated. Machine tool 130 performs a broaching operation on workpieces 132. Machine tool 130 includes a machine base 134, a left hand column 136, a right hand column 138, and associated hydraulic cylinders 140 and 142. Machine tool 130 also includes appropriate fixturing 144 and 146 to secure workpieces 132 in place during the broaching operation. During operation, broach sticks 148 travel in the -z direction to remove an increasing amount of material from workpieces 132.

By applying machining process characterization using mechanical signature analysis according to the present invention, the vibrational magnitude discriminants are obtained as illustrated in FIG. 11. Each pair of numbers characterizes the vibrational activity in a particular envelope or window measured in g's and the maximum value within that window, also measured in g's. For example, number pair 150, which includes, the values 1.8 and 3, represents vibrational activity in the ±y direction at the top of column 136. The value of 1.8 represents the most common vibrational level during the broaching operation while the value of 3 represents the maximum magnitude in that direction during the entire monitoring period.

Figure 12:
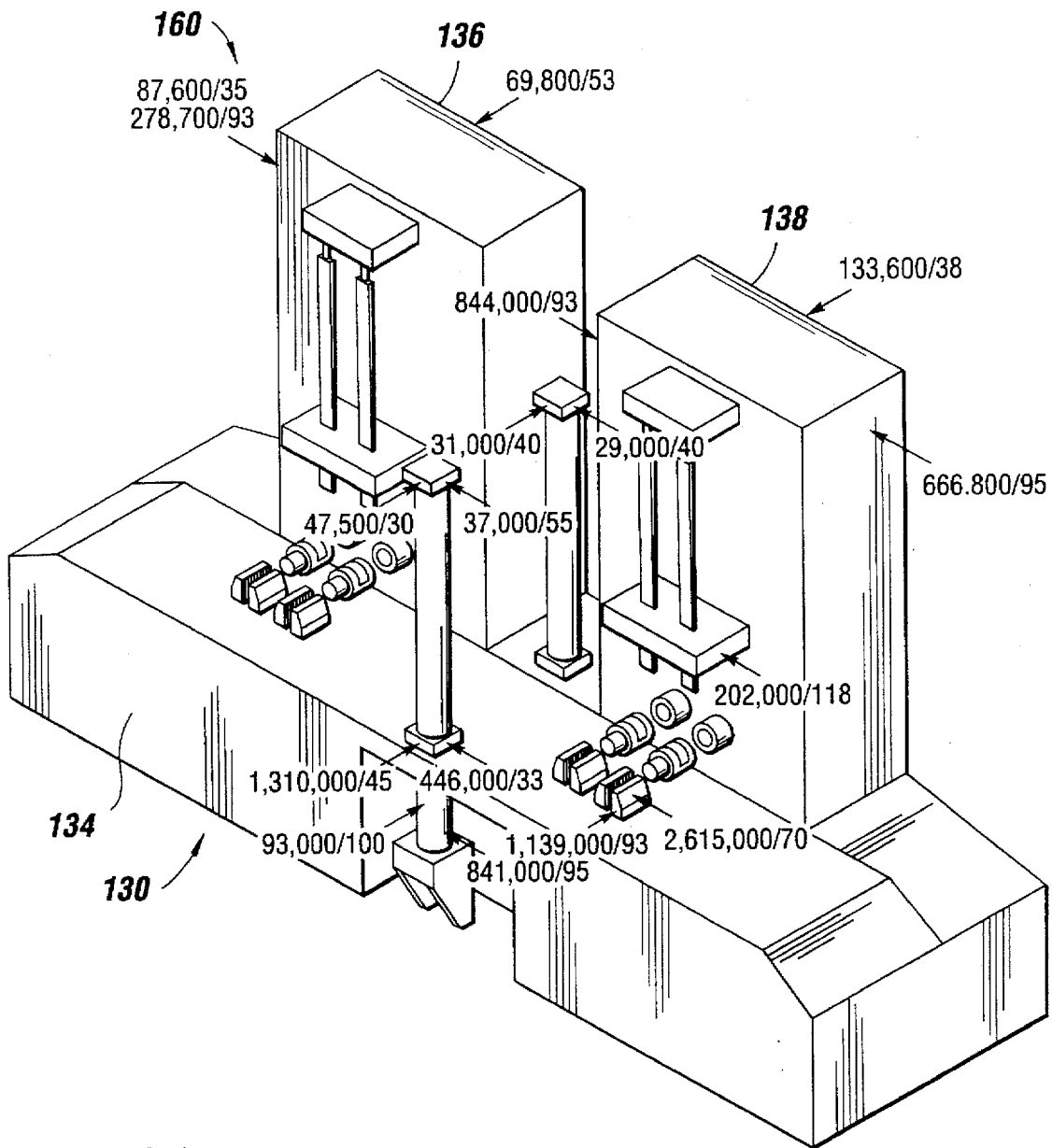
FIG. 12 illustrates minimum dynamic stiffness measurements and the corresponding frequencies of a representative machine tool characterized according to the present invention.

FIG. 12 illustrates the results of minimum dynamic stiffness testing of the broaching machine tool illustrated in FIG. 11. The number pairs 160 include a first value indicating the magnitude of the minimum dynamic stiffness in LBF/IN and a second value indicating the frequency in Hz at which the minimum dynamic stiffness occurs. As illustrated, a minimum dynamic stiffness is computed for each major machine component in an attempt to identify the "weak links" of the system for subsequent corrective action.

Figure 13:
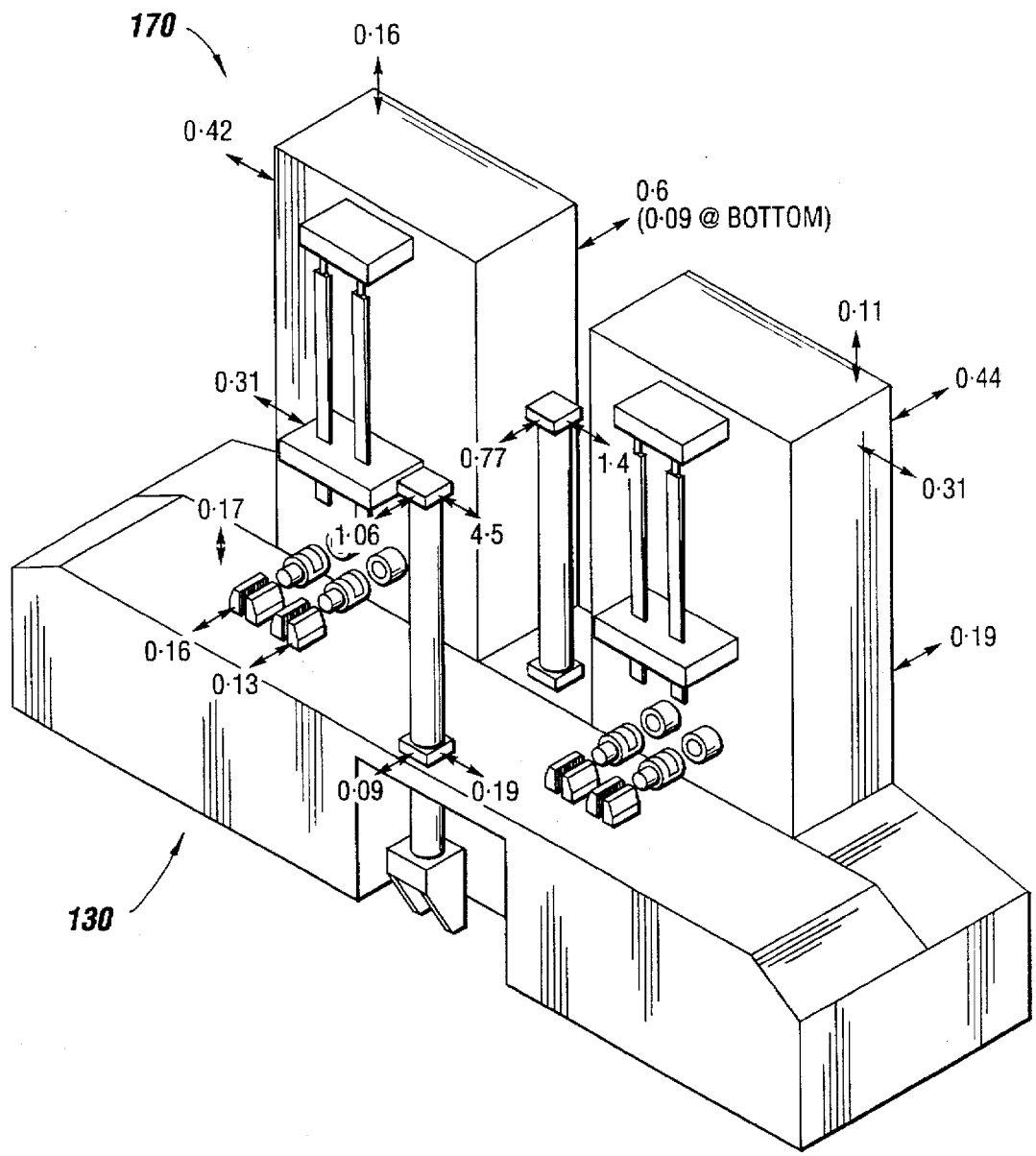
FIG. 13 illustrates the magnitude of vibration for machine components vibrating at a common frequency.

Referring now to FIG. 13, machine components of machine tool 130 vibrating with a common dominant frequency are illustrated. Values 170 indicate the magnitude of the vibrational amplitude in g's.

Referring now to FIG. 14, a representative data acquisition, analysis and storage system for use with a method according to the present invention is shown. A sensor 180 is mounted on a machine component 182 and provides a signal which is appropriately conditioned by signal conditioner 184 and filtered by a low pass filter 186. The conditioned and filtered signal is provided to oscilloscope 190 and computer 192 which includes an analog to digital (A/D) data acquisition card 194, a central processing unit 196, memory, such as random access memory (RAM) 198 and a storage medium or device, such as disc drive 200 or the like.

The data acquisition card 194 digitizes the conditioned and filtered signal with the appropriate sampling frequency. This information is then stored by the computer for subsequent analysis. In order to obtain contiguous, gap-free data, a dual channel, Direct Memory Access (DMA) Scheme is utilized such that while the data acquisition card 194 is writing to a buffer within the computer RAM 198, the CPU 196 is reading the previously stored data from a second buffer in RAM 198 and writing it in turn to the storage device 200.

Figure 15:
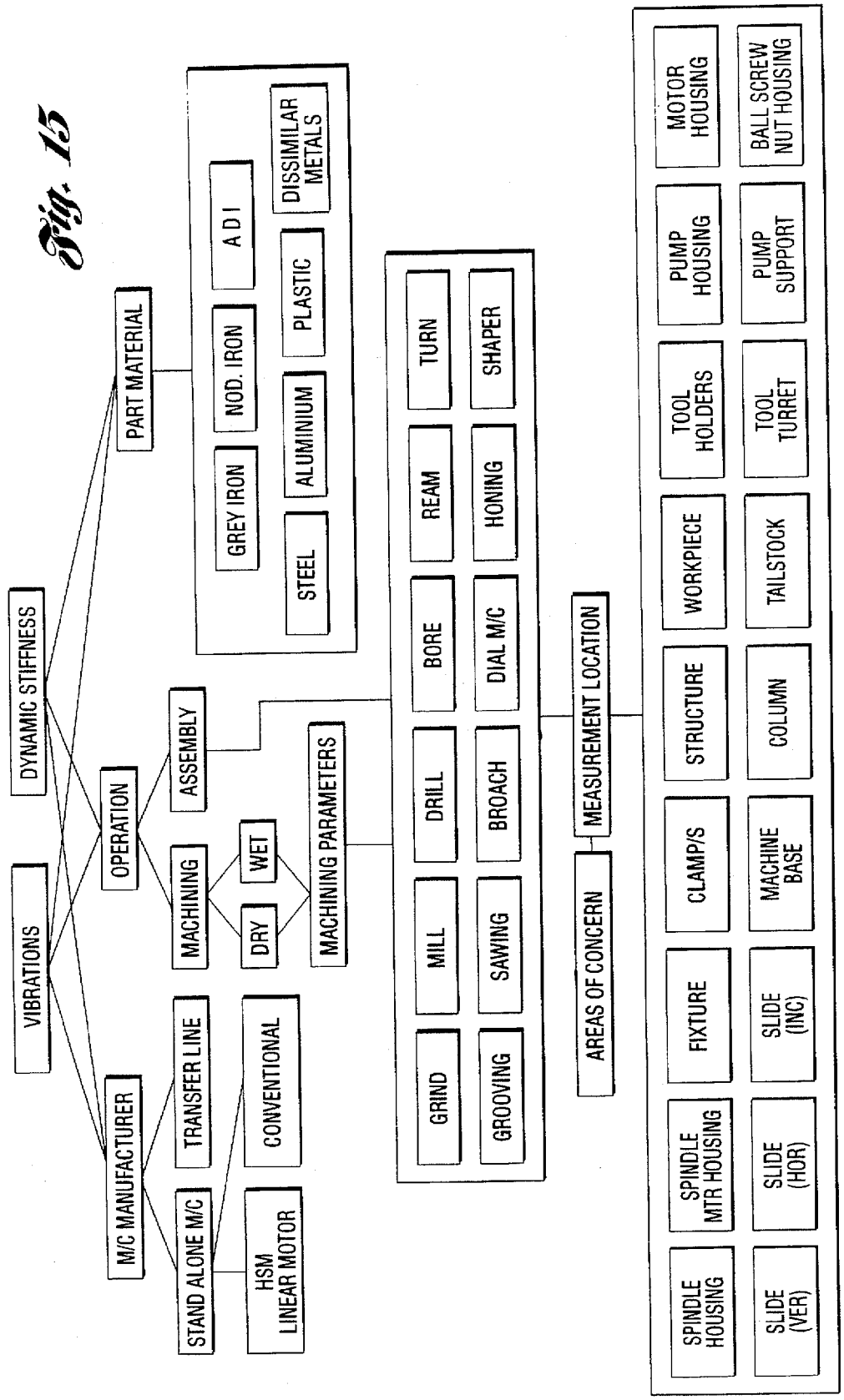
FIG. 15 illustrates a structural organization of a database for use with a machine characterization system and method according to the present invention.

FIG. 15 illustrates a database structure for machine process characterization using mechanical signature analysis according to the present invention. Characterization of a typical machine preferably includes approximately 15 to 20 cycles for vibrations monitoring under idle and machining conditions, and 10 to 15 dynamic stiffness measurements conducted according to the process illustrated and described in detail with reference to FIG. 7. Data acquisition for this process results in several megabytes of data for each machine. For a simple machining process characterization, two discriminants from each run for each sensor positions are required: the vibrational envelope amplitude and amplitude of the highest spike in the signal. Each dynamic stiffness test yields a magnitude and frequency. Thus, these 50–70 discriminants for each machine provide complete information for the vibrations and dynamic stiffness mapping of the integral system. When the characterization extends to hundreds and thousands of machines, an open structure database is necessary to efficiently organize and analyze the information.

The database structure illustrated in FIG. 15 reflects the fact that the machining process characteristics are a function of the type of machine, type of machining operation, machining process parameters and conditions, location of the monitoring points, fixturing of a given workpiece, and the workpiece material. This information allows comparison of the discriminants for decision making in machine acquisition, process capabilities determination, and identifying the root cause of various problems in existing machines.

The database structure illustrated in FIG. 15 is particularly suited to provide complete information about the machine vibrations and dynamic stiffness in a condensed format. This structure also provides meaningful information for quantitative specifications of new equipment, comparing performance of new equipment to determine whether to accept or reject the equipment based on potential problems, and measuring effectiveness of machine repairs. Furthermore, a "user-friendly" interface provides guidance to a casual user to contribute to the uniform information gathering in machine characterization.

Figure 16A:
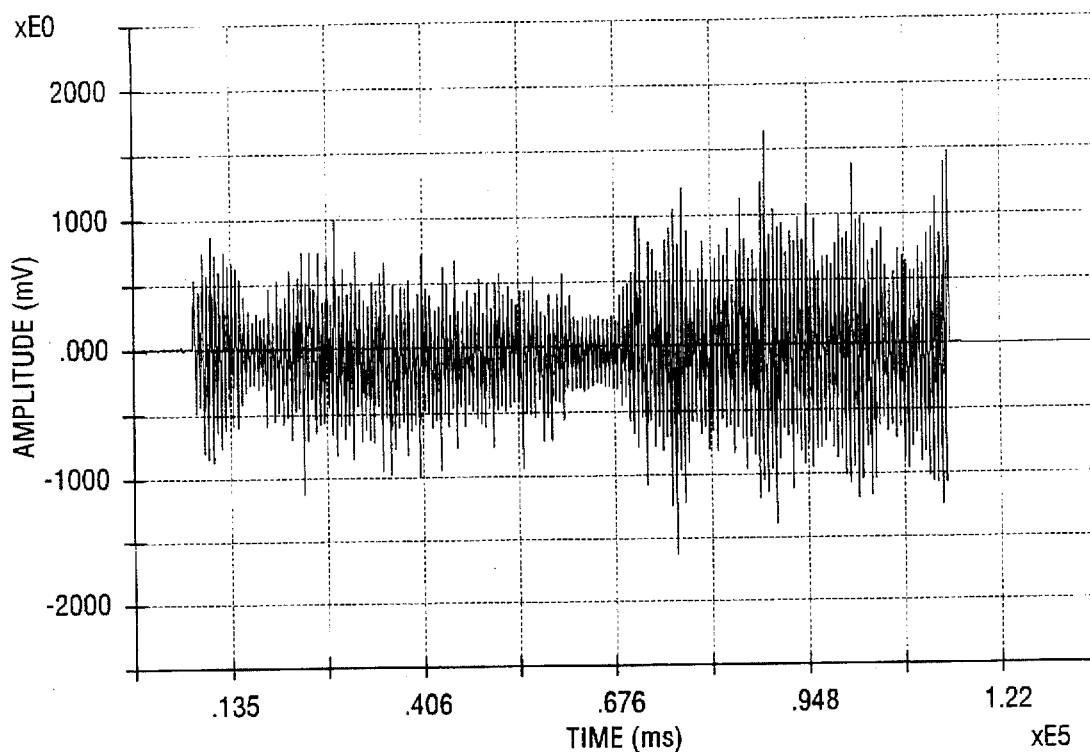
FIG. 16A illustrates an actual vibrational amplitude plot of a machine prior to detection, identification, and correction of machine tool operating anomalies according to the present invention.
Figure 16B:
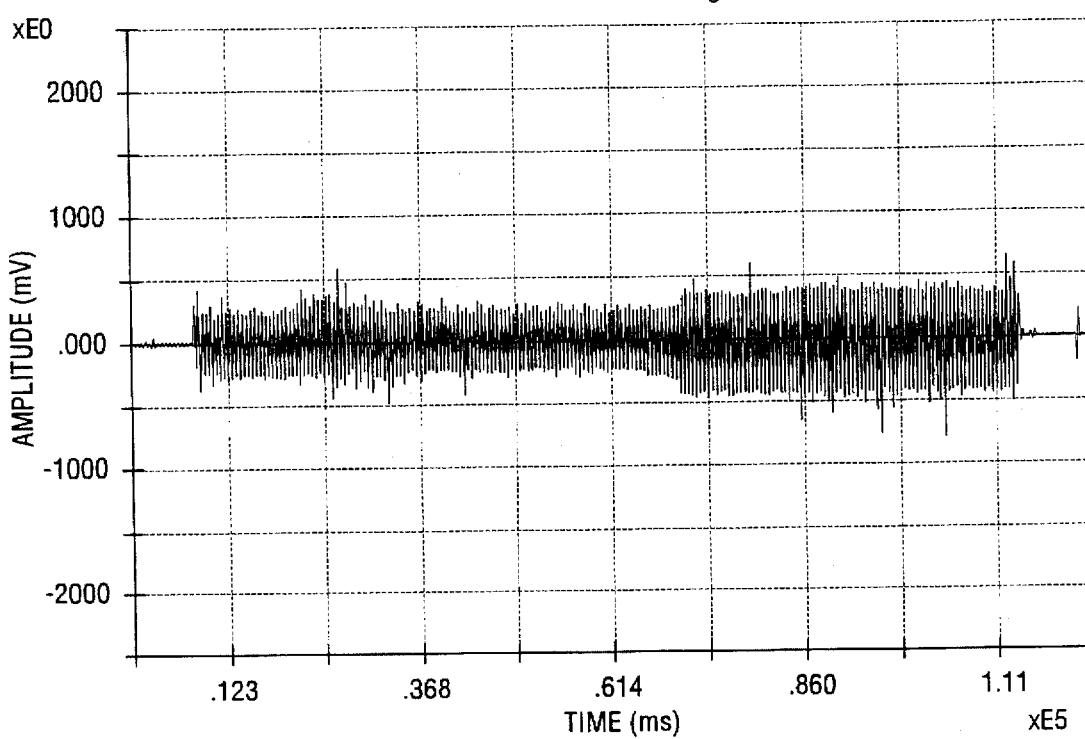
FIG. 16B illustrates a vibrational amplitude plot of the same machine tool illustrated in FIG. 16A after correction of machine tool operating anomalies detected and corrected according to the present invention.

Referring now to FIGS. 16A and 16B, an actual vibrational amplitude plot is illustrated for a gear shaper machine. FIG. 16A illustrates the vibrational amplitude during machining as captured according to the concepts of the present invention. This plot indicates an anomaly which was previously undetected in the machine. FIG. 16B illustrates the dramatic improvement achieved in the same machine after applying the system and method of the present invention and making appropriate changes to the machine.

It should be understood, of course, that while the form of the invention herein shown and described constitutes the preferred embodiment of the invention, it is not intended to illustrate all the possible forms thereof. It will also be understood that the words used are words of description rather than limitation, and that various changes may be made without departing from the spirit and scope of the invention as disclosed.

What is claimed is:

1. A method for characterizing a machine tool system including a machine tool having a plurality of cooperating elements defining a machine tool structure, tooling connected to the machine tool structure for performing a machining operation on a workpiece, and fixturing connected to the machine tool structure for securing the workpiece during machining, the method comprising:

mounting at least one sensor on the machine tool for monitoring vibrations during operation of the machine for a plurality of operating conditions including machining of the workpiece and generating a signal indicative thereof, wherein positioning of the at least one sensor is determined based on the machining operation;

storing a representation of the signal generated during operation of the machine for the plurality of operating conditions;

processing the stored representation of the signal in both time and frequency domains to select at least one discriminant characterizing the machine tool system during operation of the machine for the plurality of operating conditions; and storing the at least one discriminant in a database for future comparison of the machine tool system.

2. The method of claim 1 wherein the step of mounting at least one sensor includes mounting at least one accelerometer and wherein the plurality of operating conditions includes operation under idle conditions, under transient conditions, and under steady-state conditions.

3. The method of claim 1 further comprising:

repeating the steps of mounting, storing a representation of the signal, processing, and storing the at least one discriminant, for each of the plurality of cooperating elements.

4. The method of claim 1 wherein the step of storing a representation of the signal generated for the plurality of operating conditions comprises:

computing a dynamic stiffness value for at least one of the plurality of cooperating elements based on response of the at least one element to a measured input force.

5. The method of claim 1 wherein the at least one discriminant includes a minimum dynamic stiffness value and a frequency corresponding thereto.

6. The method of claim 1 wherein the at least one discriminant includes a time domain value of the signal over at least a portion of the machining operation, and a peak value of the signal.

7. The method of claim 1 wherein the machining operation is performed under idling conditions without removing material from the workpiece.

8. The method of claim 1 wherein the machining process is selected from the group consisting of grinding, milling, drilling, boring, reaming, turning, grooving, sawing, broaching, honing, and shaping.

9. The method of claim 1 wherein the step of mounting at least one sensor includes mounting a plurality of sensors at a corresponding plurality of locations on the machine tool, the method further comprising:

simultaneously acquiring signals from each of the plurality of sensors prior to the step of storing.

10. A method for characterizing a machining process using a limited number of discriminants, the machining process being performed on a workpiece by a machine tool having a plurality of cooperating components defining a machine tool structure, the method comprising:

analyzing the machine tool and the machining process to select at least one of the plurality of cooperating components to determine subsequent positioning and mounting of at least one sensor;

determining testing conditions based on the analyzing step;

mounting at least one sensor on the selected component for monitoring vibrations during operation of the machine for a plurality of different operating conditions including while machining the workpiece and generating a vibration signal indicative thereof, the at least one sensor being positioned and mounted according to the step of analyzing;

sampling the vibration signal and storing a digital representation thereof during operation of the machine for the plurality of different operating conditions;

processing the digital representation in both time and frequency domains to determine at least one discriminant value for each of the limited number of discriminants; and modifying at least one of the cooperating components based on the limited number of discriminants.

11. The method of claim 10 wherein the plurality of cooperating components includes at least one rotating component which includes a sensor for generating a rotational position signal, and wherein the step of sampling comprises:

sampling the vibration signal based on the rotational position signal.

12. The method of claim 10 wherein the vibration signal represents acceleration of the selected component.

13. The method of claim 10 wherein the step of processing includes computing minimum dynamic stiffness value for each of the plurality of cooperating components.

14. The method of claim 13 wherein the step of processing includes determining at least one frequency associated with the minimum dynamic stiffness value.

15. The method of claim 14 further comprising storing the limited number of discriminants in a database for future comparison of the machining process.

16. A system for characterizing a machine tool system including a machine tool having a plurality of cooperating elements defining a machine tool structure, tooling connected to the machine tool structure for performing a machining operation on a workpiece, and fixturing connected to the machine tool structure for securing the workpiece during machining, the system comprising:

at least one sensor mounted on the machine tool system for monitoring vibrations of the machine tool system under a plurality of different operating conditions including during machining of the workpiece and generating a vibration signal indicative thereof; and a processor and a memory operatively associated with the sensor for sampling the vibration signal, storing a digital representation of the vibration signal, processing the digital representation to select at least one discriminant characterizing interaction among the plurality of cooperating elements including during machining of the workpiece, and storing the at least one discriminant for subsequent comparison.

17. The system of claim 16 wherein the processor is further operative to determine a dynamic stiffness value for each of a plurality of frequencies and to determine a minimum dynamic stiffness value and its associated frequency.

* * * * *